United States Patent [19]
Huguenin

[11] Patent Number: 5,916,482
[45] Date of Patent: *Jun. 29, 1999

[54] USE OF A COMPOUND BASED ON A RARE-EARTH PHOSPHATE AS A LUMINOPHOR IN PLASMA SYSTEMS

[75] Inventor: Denis Huguenin, Asnires-sur-Sein, France

[73] Assignee: Rhone-Poulenc Chimie, Courbevoie, France

[ * ] Notice: This patent is subject to a terminal disclaimer.

[21] Appl. No.: 08/970,285

[22] Filed: Nov. 14, 1997

Related U.S. Application Data

[63] Continuation of application No. 08/672,523, Jun. 25, 1996, Pat. No. 5,725,800.

[30] Foreign Application Priority Data

Jun. 28, 1996 [FR] France ................................... 9507759

[51] Int. Cl.⁶ ...................................................... C09K 4/46
[52] U.S. Cl. ........................ 252/301.4; 313/484; 313/486
[58] Field of Search ..................................... 313/484, 486; 252/301.4

[56] References Cited

U.S. PATENT DOCUMENTS

| | | | |
|---|---|---|---|
| 4,423,349 | 12/1983 | Nakajima et al. | 252/301.4 P |
| 5,091,110 | 2/1992 | Fan et al. | 252/301.4 P |
| 5,314,641 | 5/1994 | Collin et al. | 252/301.4 P |
| 5,340,556 | 8/1994 | Collin et al. | 252/301.4 P |
| 5,567,403 | 10/1996 | Kimura et al. | 252/301.4 P |

FOREIGN PATENT DOCUMENTS

| | | | |
|---|---|---|---|
| 52-75673 | 6/1977 | Japan | 252/301.4 P |
| 57-40853 | 3/1982 | Japan | 252/301.4 P |
| 63-37184 | 2/1988 | Japan | 252/301.4 P |
| 7602318 | 9/1976 | Netherlands | 252/301.4 P |

*Primary Examiner*—Melissa Koslow
*Attorney, Agent, or Firm*—Katherine L. Carleton; Jean-Louis Seugnet

[57] ABSTRACT

The invention relates to the use as a luminophor in plasma systems of a compound based on an yttrium, lanthanum, gadolinium or lutecium phosphate doped with at least one rare earth chosen from the group comprising terbium, praseodymium, europium and cerium.

4 Claims, No Drawings

USE OF A COMPOUND BASED ON A RARE-EARTH PHOSPHATE AS A LUMINOPHOR IN PLASMA SYSTEMS

This application is a continuation of application Ser. No. 08/672,523 filed Jun. 25, 1996 which application is now: abandoned now U.S. Pat. No. 5,725,800.

The present invention relates to the use of a compound based on a rare-earth phosphate as a luminophor in plasma systems.

Plasma systems (screens and lamps) form part of new display and lighting techniques which are being developed. One concrete example consists in the replacement of current television screens by flat screens, which are less heavy and have larger dimensions, and this replacement is on the point of being resolved by the use of plasma panels.

In plasma systems, a gas introduced into a chamber is ionized under the effect of an electric discharge. High-energy electromagnetic radiation is emitted during this process. The photons are directed onto a luminescent material. In order to be effective, this material should be a luminophor which absorbs in the emission range of the plasma and emits in the visible range with the highest possible efficiency and with the appropriate colour.

The object of the invention is to provide such a luminophor material.

To this end, according to the invention, the material used as a luminophor in plasma systems is a compound based on an yttrium, lanthanum, gadolinium or lutecium phosphate doped with at least one rare earth chosen from the group comprising terbium, praseodymium, europium and cerium.

Other characteristics, details and advantages of the invention will become more clearly apparent on reading the following description.

The invention relates to the use of the compound described above as a luminophor under conditions corresponding to those in plasma systems. In the context of the present invention, this term is taken to mean all systems employing a gas which, after ionization, emits radiation corresponding at least to wavelengths between 10 and 200 nm, that is to say the far ultraviolet range.

Systems of this type which may be mentioned include plasma lamps and screens.

According to the invention, use is made of a compound comprising a matrix of the yttrium, lanthanum, gadolinium or lutecium phosphate type.

Several types of phosphates may be used. They may be orthophosphates of formula $LnPO_4$, Ln representing one of the elements mentioned above. Metaphosphates of formula $LnP_3O_9$ or pentaphosphates of formula $LnP_5O_{14}$ may also be used.

The matrix of the type described above is doped with at least one rare earth which is chosen from the group comprising terbium, praseodymium, europium and cerium.

The rare earth is chosen in accordance with the desired emission colour.

The rare-earth dopant content, expressed as an atomic percentage relative to the total rare-earth content in the phosphate (rare-earth dopant/rare-earth dopant+Ln), is generally between 10 and 50%, and more particularly between 20 and 45%.

According to a particular embodiment of the invention, the phosphate used is a lanthanum phosphate.

According to another particular embodiment of the invention, the rare earth dopant is a combinaison of terbium and cerium. The terbium may be in a major proportion with respect to the cerium and more particularly in an atomic proportion Tb/Ce+Tb of at least 80%. As a example the product of the following formula can be given $La_{0.76} Tb_{0.22} PO_4$ According to another variant of the invention, it may be beneficial to use phosphates with specific particle size distributions.

The mean size of the phosphates may thus be between 1 and 20 μm, and more particularly between 2 and 6 μm.

Furthermore, their dispersion index may be less than 0.5, and more particularly less than 0.4.

The mean diameter of the particles is measured by using a laser granulometer of the CILAS type (CILAS HR 850).

For its part, the dispersion index I is determined by the formula:

$$I = \frac{\phi_{84} - \phi_{16}}{2\phi_{50}}$$

in which:

$\phi_{84}$ is the particle diameter for which 84% of the particles have a diameter less than $\phi_{84}$, $\phi_{16}$ is the particle diameter for which 16% of the particles have a diameter less than $\phi_{16}$, and $\phi_{50}$ is the mean diameter of the particles.

The phosphates used and, more particularly, the orthophosphates, may be in a monoclinic crystalline form.

The phosphates used in the context of the present invention can be obtained by any known method. One particular method, given without implying any limitation, will be described below.

This method consists in carrying out direct precipitation at controlled pH by reacting (I) a first solution containing soluble salts of rare earths, these elements then being present in the stoichiometric proportions required for obtaining a product with the desired formula, with (II) a second solution containing phosphate ions.

The solution of soluble rare-earth salts is progressively and continuously introduced into the solution containing the phosphate ions.

The initial pH of the solution containing the phosphate ions is less than 2, and preferably between 1 and 2.

The pH of the precipitation medium is subsequently adjusted to a pH value of less than 2, and preferably between 1 and 2.

The term "controlled pH" means that the pH of the precipitation medium is kept at a certain constant, or substantially constant, value by adding basic compounds or buffer solutions into the solution containing the phosphate ions, at the same time as the solution containing the soluble rare-earth salts is introduced into this solution. The pH of the medium will thus vary by at most 0.5 of a pH unit around the fixed set-point value, and more preferably by at most 0.1 of a pH unit around this value. The fixed set-point value will advantageously correspond to the initial pH (less than 2) of the solution containing the phosphate ions.

The pH is advantageously adjusted by adding a basic compound, as will be explained below.

The precipitation is preferably carried out in an aqueous medium at a temperature which is not a critical factor and which is advantageously between room temperature (15° C.–25° C.) and 100° C. This precipitation takes place with the reaction medium being stirred.

The concentrations of the rare-earth salts in the first solution can vary within wide limits. Thus, the total rare-earth concentration may be between 0.01 mol/liter and 3 mol/liter.

Suitable rare-earth salts are, in particular, salts which are soluble in an aqueous medium, such as, for example, nitrates, chlorides, acetates, carboxylates or a mixture thereof. The salts which are preferred according to the invention are nitrates.

The phosphate ions intended to react with the rare-earth salt solution may be supplied by pure compounds or compounds in solution, such as, for example, phosphoric acid, phosphates of alkali metals or other metallic elements which give a soluble compound with the anions associated with the rare earths.

According to a preferred variant, the phosphate ions are added in the form of ammonium phosphates because the ammonium cation will decompose during the subsequent calcination, thus making it possible to obtain a high-purity rare-earth phosphate. Among the ammonium phosphates, diammonium or monoammonium phosphate are the preferred compounds for implementing the invention.

The phosphate ions are present in a quantity such that there is, between the two solutions, a $PO_4/Ln$ molar ratio of greater than 1, and advantageously between 1.1 and 3.

As already indicated, the solution containing the phosphate ions should initially have (that is to say before the start of the introduction of the rare-earth salt solution) a pH of less than 2, and preferably between 1 and 2. Thus, if the solution used does not naturally have such a pH, the pH is brought to the desired suitable value either by adding a base (for example ammonia solution in the case of a phosphoric acid initial solution) or by adding an acid (for example nitric acid, in the case of a diammonium phosphate initial solution).

Subsequently, as the solution containing the rare-earth salt or salts is introduced, the pH of the precipitation medium decreases progressively. A base is thus simultaneously introduced into this medium, with the aim of keeping the pH of the precipitation medium at the desired constant working value, which should be less than 2 and preferably between 1 and 2.

Suitable basic compounds which may be mentioned by way of examples are metal hydroxides (NaOH, KOH, $CaOH_2$, . . . ) or ammonium hydroxide, or any other basic compound whose constituent species will not form a precipitate when they are added to the reaction medium, by combining with one of the species also contained in this medium, and which allows the pH of the precipitation medium to be adjusted.

At the end of the precipitation step, a phosphate precipitate is directly obtained which can be recovered by any means known per se, in particular by simple filtration. The recovered product can then be washed, for example with water, with the aim of removing possible impurities from it, in particular adsorbed nitrate and/or ammonium groups.

The precipitate obtained is then subjected to a heat-treatment at a temperature generally above 600° C. and advantageously between 900 and 1200° C. This heat-treatment or calcination makes it possible to obtain a product which has luminescence properties. It is equally well possible to carry out the calcination under a reducing atmosphere (for example hydrogen) or a neutral atmosphere (for example argon), or mixtures thereof or else under a non-reducing atmosphere, in particular under an oxidizing atmosphere such as, for example, air.

The phosphates used in the context of the present invention can also be obtained by the chamotte process. In this case, the procedure adopted may be to form a mixture of the oxides of the various rare earths or to take a mixed rare-earth oxide and phosphatize this mixture or this mixed oxide by calcination in the presence of diammonium phosphate.

In order to develop the luminescence properties further, the phosphates may be subjected to a heat-treatment in the presence of a flux.

Suitable fluxes which may be mentioned are, in particular, lithium fluoride, lithium chloride, potassium chloride, ammonium chloride, boron oxide and ammonium phosphates, this list being, of course, in no way limiting. The flux is mixed with the mixed phosphate to be treated, then the mixture is heated to a temperature of greater than 1000° C., generally between 1000° C. and 1200° C., this being done under an atmosphere which is suited to the nature of the rare earth and which is a reducing atmosphere in the case of cerium or terbium, for example. After treatment, the product is washed then rinsed, so as to obtain a luminophor in a deagglomerated state.

As indicated above, the phosphate-based compounds which have just been described have properties of luminescence under electromagnetic excitation in the wavelength range used in plasma systems.

For this reason, they can be used as a luminophor in these systems and, more generally, they may be incorporated in the manufacture of such systems. The luminophors are employed according to well-known techniques, for example deposition by screen printing, electrophoresis or sedimentation.

An example is given below.

EXAMPLE

Preparation of the phosphates

The preparation of the product of formula $La_{0.55}Ce_{0.30}Tb_{0.15}PO_4$ is given above. The other phosphates, of formula $La_{0.88}Tb_{0.12}PO_4$, $La_{0.83}Tb_{0.17}PO_4$, $La_{0.70}Tb_{0.30}PO_4$ and $La_{0.78}Tb_{0.22}PO_4$, are prepared in the same way by adapting the reactant proportions.

500 ml of a solution of rare-earth nitrates with an overall concentration of 1.5 mol/l and having the following composition: 0.825 mol/l of $La(NO_3)_3$; 0.45 mol/l of $Ce(NO_3)_3$ and 0.225 mol/l of $Tb(NO_3)_3$, are added in one hour to 500 ml of a phosphoric acid solution $H_3PO_4$, previously brought to pH 1.4 by adding ammonium solution and heated to 60° C.

The phosphate/rare-earth molar ratio is 1.15. The pH during the precipitation is adjusted to 1.4 by adding ammonia solution.

After the precipitation step, the reaction medium is further maintained at 60° C. for one hour.

The precipitate is then recovered by filtration, washed with water then dried at 60° C. under air. The product is then in the form of a white powder (resembling a talc) consisting of particles (agglomerates) of 3 to 6 microns formed by compact aggregates of approximately 250 nm, themselves formed by the aggregation of elementary crystallites with sizes of between 30 and 150 nm. The powder is then subjected to a heat-treatment at 1150° C. under air.

X-ray analysis shows that the product is an orthophosphate with monoclinic crystalline structure. It consists of compact grains of approximately 250 nm, agglomerated in the form of spherical particles with sizes of between 3 and 6 microns. The CILAS particle size distribution, measured after cursory deagglomeration under ultrasound, gives a $\phi_{50}$ of 4.5 microns with a very tight distribution since the dispersion index is less than 0.4.

Performance of the phosphates

The performance is evaluated in two ways.

A—the powder is compacted by hand in cylindrical cavities, 8 mm in diameter, which are then arranged in a chamber under a vacuum of $10^{-6}$ torr at room temperature. The excitation source is electromagnetic emission produced by a synchrotron and with a wavelength of between 150 and 350 nm. The efficiency values correspond to the number of photons emitted in the visible range compared with the number of incident photons at 160 nm and 200 nm, respectively.

| Product | Efficiency % at 200 nm | Efficiency % at 160 nm |
|---|---|---|
| $La_{0.88}Tb_{0.12}PO_4$ | 60 | 72 |
| $La_{0.83}Tb_{0.17}PO_4$ | 65 | 76 |
| $La_{0.78}Tb_{0.22}PO_4$ | 70 | 85 |
| $La_{0.55}Ce_{0.30}Tb_{0.15}PO_4$ | 70 | 85 |

E—The products are evaluated on a plasma-screen test cell containing a gas of the helium-neon type. The light output efficiency is measured with a photometer and it is compared with that of manganese-doped zinc silicate, to which a value of 100 is arbitrarily assigned.

| Product | Light output efficiency |
|---|---|
| $La_{0.83}Tb_{0.17}PO_4$ | 125 |
| $La_{0.78}Tb_{0.22}PO_4$ | 134 |
| $La_{0.70}Tb_{0.30}PO_4$ | 120 |

It is seen that the light output efficiencies are superior to that obtained with the doped zinc silicate used in the prior art.

I claim:

1. A process for having a plasma system emit wavelengths in the visible range comprising directing photons of a wavelength between 10 and 200 nm, from an ionized gas onto a luminophor comprising:

(i) a compound based on a phosphate of a rare-earth of the formula $LnP_3O_9$ or $LnP_5O_{14}$, Ln being selected from the group consisting of yttrium, lanthanum, gadolinium or lutecium, and (ii) a dopant of compound (i) being a rare-earth which is a combination of terbium, and cerium.

2. A process according to claim 1, wherein the phosphate has a rare-earth dopant content, expressed as an atomic percentage, relative to the total rare-earth content of the phosphate, of between about 10% and about 50%.

3. A process according to claim 1, wherein the atomic proportion terbium/cerium+terbium is of at least about 80%.

4. A process according to claim 1, wherein the phosphate has a mean particle size of between about 1 and about 20 μm and a dispersion index of less than about 0.5.

* * * * *